(12) United States Patent
Lee et al.

(10) Patent No.: US 8,638,321 B2
(45) Date of Patent: Jan. 28, 2014

(54) DISPLAY APPARATUS

(75) Inventors: Kyung-kyun Lee, Mapo-gu (KR); Sang-hak Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1146 days.

(21) Appl. No.: 11/717,046

(22) Filed: Mar. 13, 2007

(65) Prior Publication Data

US 2007/0210223 A1    Sep. 13, 2007

(30) Foreign Application Priority Data

Mar. 13, 2006  (KR) .................. 10-2006-0023083
Oct. 25, 2006  (KR) .................. 10-2006-0104024

(51) Int. Cl.
*G06F 3/038*    (2006.01)
*G09G 5/00*    (2006.01)
*G06F 1/16*    (2006.01)
*H05K 5/00*    (2006.01)
*H05K 7/00*    (2006.01)
*A47F 5/02*    (2006.01)
*A47F 5/00*    (2006.01)

(52) U.S. Cl.
USPC .. 345/204; 361/679.06; 248/131; 248/346.01

(58) Field of Classification Search
USPC ............ 345/1.1–111, 204–204; 248/121, 248/127–132, 144, 145, 346.01; 361/679.01–679.07, 679.21
See application file for complete search history.

(56) References Cited

U.S. PATENT DOCUMENTS

| | | | |
|---|---|---|---|
| 5,173,686 A | | 12/1992 | Fujihara |
| 6,115,039 A | * | 9/2000 | Karren et al. ............. 715/746 |
| 6,370,020 B1 | | 4/2002 | Toukairin |
| 6,606,081 B1 | | 8/2003 | Jaeger et al. |
| 7,287,731 B2 | * | 10/2007 | Johnson ............. 248/183.3 |
| 2002/0171637 A1 | | 11/2002 | Kadowaki et al. |
| 2006/0030954 A1 | | 2/2006 | Bergman et al. |
| 2006/0284034 A1 | | 12/2006 | Takaji et al. |

(Continued)

FOREIGN PATENT DOCUMENTS

EP    1954039 A2    8/2008
JP    2004-304679 A    10/2004

(Continued)

OTHER PUBLICATIONS

Communication, dated Nov. 16, 2012, issued by the Korean Intellectual Property Office in counterpart Korean Patent Application No. 10-2006-0104024.

(Continued)

*Primary Examiner* — Srilakshmi K Kumar
(74) *Attorney, Agent, or Firm* — Sughrue Mion, PLLC (57) ABSTRACT

A display apparatus including a display main body having a display part to display an image, a control part to control the display part and a power supplying part to supply power; a stand part to support the display main body and to accommodate a cable unit transmitting a signal from the power supplying part and the control part; a driving part electrically connected to the cable unit to perform a swivel mechanism of the stand part; and a base part to support the stand part and the driving part, the power supplying part supplying power to the driving part, and the control part controlling the driving part to perform the swivel mechanism.

33 Claims, 7 Drawing Sheets

(56) References Cited

U.S. PATENT DOCUMENTS

| | | |
|---|---|---|
| 2007/0210223 A1 | 9/2007 | Lee et al. |
| 2007/0276250 A1 | 11/2007 | Donaldson |
| 2008/0093528 A1 | 4/2008 | Tsai et al. |
| 2008/0186416 A1 | 8/2008 | Kaminosono |
| 2010/0289972 A1 | 11/2010 | Fu |

FOREIGN PATENT DOCUMENTS

| | | |
|---|---|---|
| JP | 2007-10979 A | 1/2007 |
| KR | 1993-0003736 A | 2/1993 |
| KR | 1993-0003739 A | 2/1993 |
| KR | 1999-0020753 U | 6/1999 |
| KR | 2000-0021532 A | 4/2000 |
| KR | 10-2004-0036146 A | 4/2004 |

OTHER PUBLICATIONS

Communication and Extended Search Report issued Apr. 4, 2011 in counterpart European Application No. 10192546.9.

Non-Final Office Action mailed May 3, 2013, in U.S. Appl. No. 12/960,121.

* cited by examiner

DISPLAY APPARATUS

CROSS-REFERENCE TO RELATED APPLICATIONS

This application claims priority from Korean Patent Application No. 2006-0023083, filed on Mar. 13, 2006, and Korean Patent Application No. 2006-0104024, filed on Oct. 25, 2006, in the Korean Intellectual Property Office, the disclosures of which are incorporated herein by reference.

BACKGROUND OF INVENTION

1. Field of Invention

Methods and apparatuses consistent with the present invention relate to a display apparatus, and more particularly, to a display apparatus having an improved swiveling configuration of a display main body.

2. Description of the Related Art

Generally, a display apparatus is provided as a TV, a computer, or a portable telephone, etc., to display an image based on signal received from a wired or wireless system. For example, liquid crystal displays, which have the advantage of being slim and light weight, are commonly used as a display main body.

The display apparatus is installed on an installation surface such as a table. However, an image quality of the display apparatus varies according to a viewing angle of a user. In the case that a liquid crystal display is provided as the display main body, since the liquid crystal display has a limited visible angle, it is necessary that the display apparatus swivels to face a user.

The display apparatus in the related art includes a stand part supporting the display main body, and a base part contacting with an installation surface to support the stand part. A ring member is interposed between the stand part and the base part. If a user manually applies a force to the display main body, the stand part slides against the ring member of the base part contacted to an installation surface so that the display main body swivels.

However, in these display apparatuses, a user must manually swivel the display main body. Thus, it is inconvenient to swivel the display main body. Also, as the user manually swivels the display main body, it is difficult for the user to apply a uniform force thereto, and accordingly, it is difficult to stably swivel the display main body. Thus, the components in the display main body may be negatively impacted.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above. Accordingly, it is an aspect of the present invention to provide a display apparatus automatically, simply and stably swiveling a display main body.

The foregoing and/or other aspects of the exemplary embodiments of the present invention can be achieved by providing a display apparatus comprising: a display main body comprising a display part to display an image, a control part to control the display part and a power supplying part to supply power; a stand part to support the display main body and to accommodate a cable unit transmitting an electric signal from the power supplying part and the control part; a driving part electrically connected to the cable unit to perform a swivel mechanism of the stand part; and a base part to support the stand part and the driving part, the power supplying part supplying power to the driving part, and the control part controlling the driving part to perform the swivel mechanism.

According to an aspect of the present invention, the driving part comprises a motor comprising a rotating shaft of which an end part is supported to the base part and coupled to the stand part.

According to another aspect of the present invention, the driving part further comprises a driving circuit part provided in the motor to be electrically connected to the control part and controlling the motor based on a signal from the control part.

According to another aspect of the present invention, the base part comprises a shaft supporting part to support the end part of the rotating shaft so that the stand part swivels according to driving the motor.

According to another aspect of the present invention, the driving part comprises a motor comprising a rotating shaft of which an end part is supported to the stand part and coupled to the base part.

According to another aspect of the present invention, the driving part further comprises a driving circuit part provided in the motor to be electrically connected to the control part and controlling the motor based on a signal from the control part.

According to another aspect of the present invention, the stand part comprises a shaft supporting part to support the end part of the rotating shaft so that the stand part swivels according to driving the motor.

According to another aspect of the present invention, the stand part comprises a stand extending part to extend from an end part of the stand part toward the base part.

According to another aspect of the present invention, the base part comprises a guide groove through which the stand extending part passes, formed in a circular arc and guiding the stand extending part.

According to another aspect of the present invention, the display apparatus further comprises a bracket part provided to a rear side of the base part to prevent the stand part from being separated from the base part.

According to another aspect of the present invention, the bracket part is coupled to the stand extending part which passes through the guide groove.

According to another aspect of the present invention, the display apparatus further comprises contact sensors provided at opposite ends of the guide groove and sensing whether the stand extending part reaches one of the opposite ends of the guide groove.

According to another aspect of the present invention, the control part receives a signal from the contact sensors to control the driving part.

According to another aspect of the present invention, the display apparatus further comprises at least one friction member rotatably supporting the stand part with respect to the base part.

According to another aspect of the present invention, the friction member comprises a bearing part.

According to another aspect of the present invention, the bearing part comprises a first bearing part interposed between the stand part and the base part; and a second bearing part interposed between the base part and the bracket.

BRIEF DESCRIPTION OF THE DRAWINGS

The above and/or other aspects of the prevent invention will become apparent and more readily appreciated from the following description of the exemplary embodiments, taken in conjunction with the accompanying drawings, in which.

DETAILED DESCRIPTION OF THE ILLUSTRATIVE NON-LIMITING EXEMPLARY EMBODIMENTS OF THE INVENTION

Reference will now be made in detail to the exemplary embodiments of the present invention, examples of which are illustrated in the accompanying drawings, wherein like reference numerals refer to like elements throughout. The exemplary embodiments are described below so as to explain various aspects of the present invention by referring to the figures.

Figure 1:
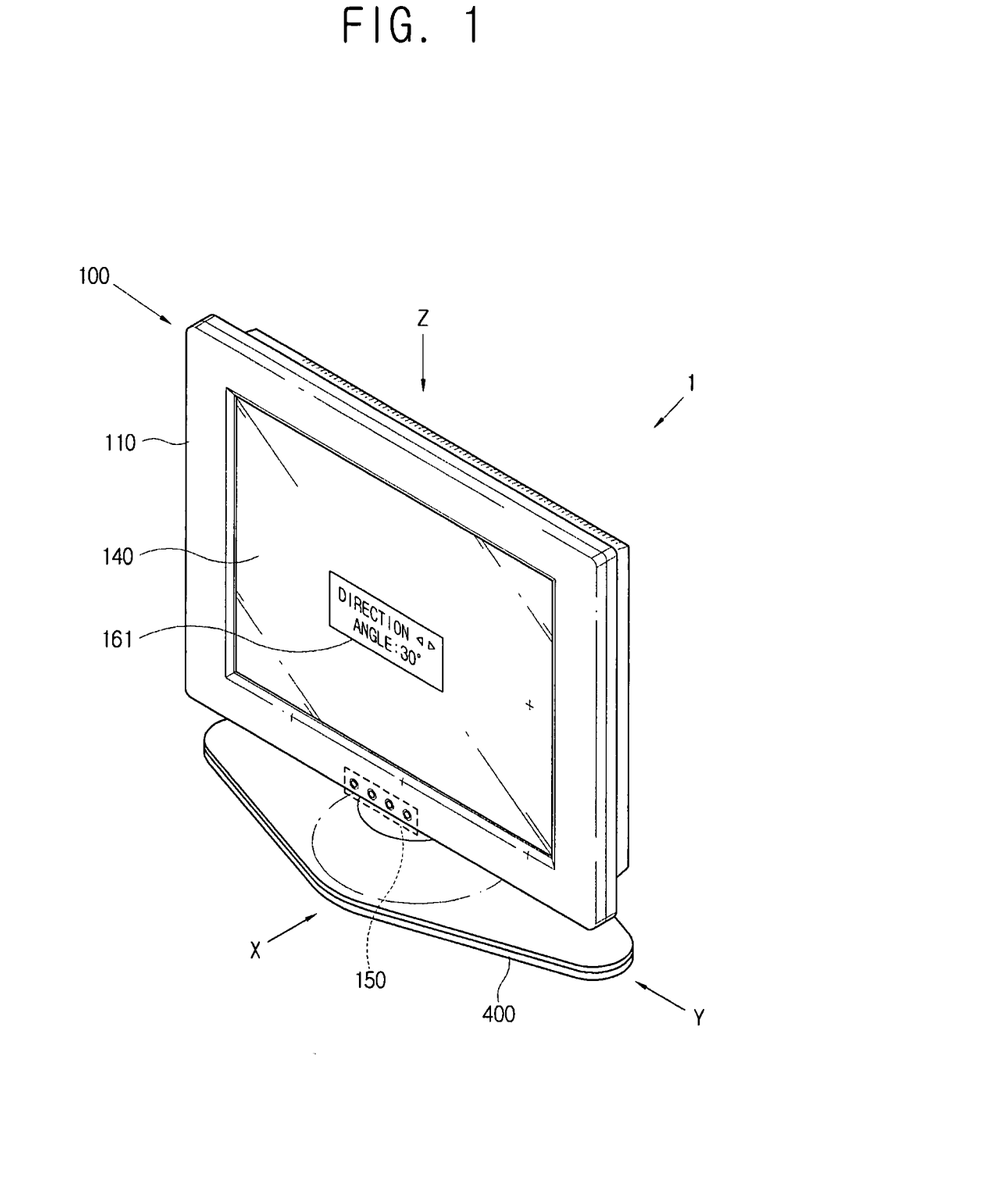
FIG. 1 is a perspective view illustrating a display apparatus according to exemplary embodiments of the present invention.

In FIG. 1, a direction X refers to a direction toward a front of a display apparatus 1, a direction Y refers to a direction toward a side of the display apparatus 1 and perpendicular to the direction X, and a direction Z refers to a direction toward a top of the display apparatus 1 and perpendicular to respect to the directions X and Y.

As shown in FIGS. 1 to 6, the display apparatus 1 according to a first exemplary embodiment includes a display main body 100, a stand part 200 supporting the display main body 100, a driving part 300 performing a swivel mechanism of the stand part 200, and a base part 400 contacting with an installation surface such as a table to support the stand part 200 and the driving part 300. The display apparatus 1 includes a guide groove 430 and contact sensors 431a and 431b for restricting a swiveling angle with which the stand part 200 can swivel. Also, the display apparatus 1 includes at least one bearing part 470a and 470b rotatably supporting the stand part 200 with respect to the base part 400 so that the stand part 200 may be swiveled smoothly.

Figure 6:
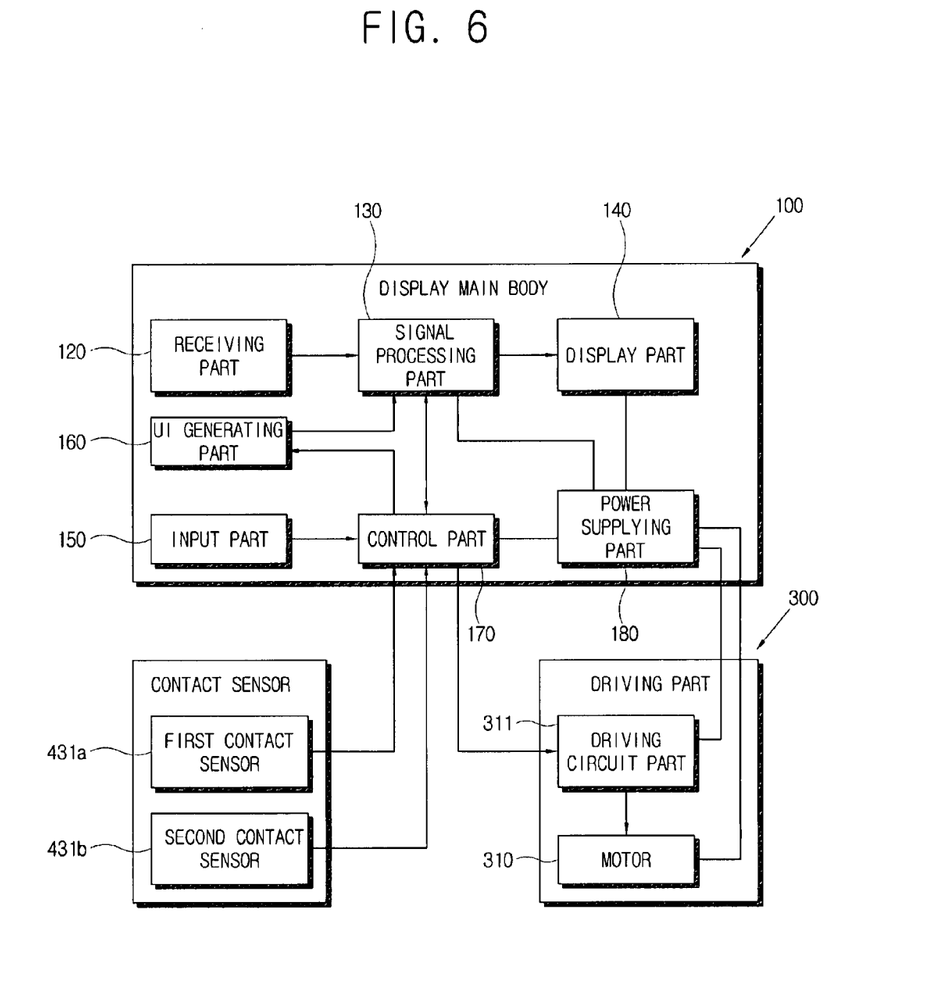
FIG. 6 is a configuration view of the display apparatus according to the exemplary embodiments of the present invention.

The display main body 100 includes a receiving part 120, a signal processing part 130, a display part, an input part 150, a UI generating part 160, a control part and a power supplying part 180 which are accommodated in a casing 110.

The receiving part 120 receives a video signal from an external device such as a computer main body (not shown). The receiving part 120 includes various kinds of connecting terminals, e.g., a D-Sub terminal, a DVI terminal, etc., to receive various formats of video signals.

The signal processing part 130 processes a video signal which is input from the receiving part 120 according to control by the control part 170 to display a corresponding image on the display part 140. The signal processing part 130 may includes various functions corresponding to various formats of video signals to be input. For example, the signal processing part 130 may include a converting function to convert various formats of video signals into a format of digital video signal, a scaling function to adjust vertical frequency, resolution, an aspect ratio, etc., of digital or analog video signals to be suitable for an output standard of the display part 140.

The display part 140 displays images corresponding to video signals which are processed in the signal processing part 130. The display part 140 may be provided as a digital light processing (DLP) system, a liquid crystal display (LCD), a plasma display panel (PDP), etc. The display part 140 is exposed to the outside through an opening of the casing 110, so that a user may see displayed images.

The input part 150 is provided to select various options by operation of the user, displaying the images on the display part 140. The input part 150 may includes various configurations such as a menu key 150 formed on the casing 110, a remote controller, or the like. The input part 150 generates an operation signal according to the operation of the user and transmits the operation signal to the control part 170.

The user may determine a swivel direction and a swivel angle of the stand part 200 through the input part 150. The input part 150 is operated by the user, and thus the control part 170 may drive the driving part 300 according to the intent of the user.

The user interface (UI) generating part 160 provides a user interface screen 161 to set up the swivel direction and the swivel angle of the stand part 200. A video signal corresponding to the user interface screen 161 which is output from the UI generating part 160 is transmitted to the signal processing part 130 and synthesized with the video signal which is processed in the signal processing part 130, thereby being displayed as an image on the display part 140. Here, the user sets up the swivel direction and the swivel angle of the stand part 200 through the input part 150, which may be assured through the user interface screen 161 displayed on the display part 140. It is preferred that the UI generating part 160 includes an on screen display (OSD) generating part which generates an OSD screen.

The control part 170 controls the signal processing part 130 to display the video signal transmitted from the receiving part 120 as an image on the display part 140. The control part 170 receives the operation signal from the input part 150, and controls the UI generating part 160 and the signal processing part 130 to display an image based on the operation signal on the display part 140.

Further, the control part 170 controls the driving part 300 to swivel the stand part 200 to desired direction and angle on the basis of the operation signal from the input part 150. The control part 170 receives a signal of the contact sensor 431a and 431b to control the driving part 300.

The control part 170 may control the driving part 300 to stop by receiving the signal generated by the contact sensor 431a and 431b, in the case that a stand extending part 227 contacts with the contact sensor 431a and 431b while the stand part 200 swivels.

The control part 170 may drive the driving part 300 to swivel the stand part 200 reversely while the stand extending part 227 is in contact with the contact sensor 431a and 431b of an end of a guide groove 430.

The power supplying part 180 is connected to an external power source to supply power to components in the display main body 100. Further, the power supplying part 180 supplies power to the driving part 300 to be driven.

A cable unit 190 extends from the display main body 100 and is accommodated in a cable unit accommodating part 230 to extend to the driving part 300. The cable unit 190 includes a control cable 191 electrically connecting the control part 170 and the driving part 300 so that the control part 170 may control the driving part 300, and a power cable 193 electrically connecting the power supplying part 180 and the driving part 300 so that the power supplying part 180 may supply the power to the driving part 300.

Figure 2:
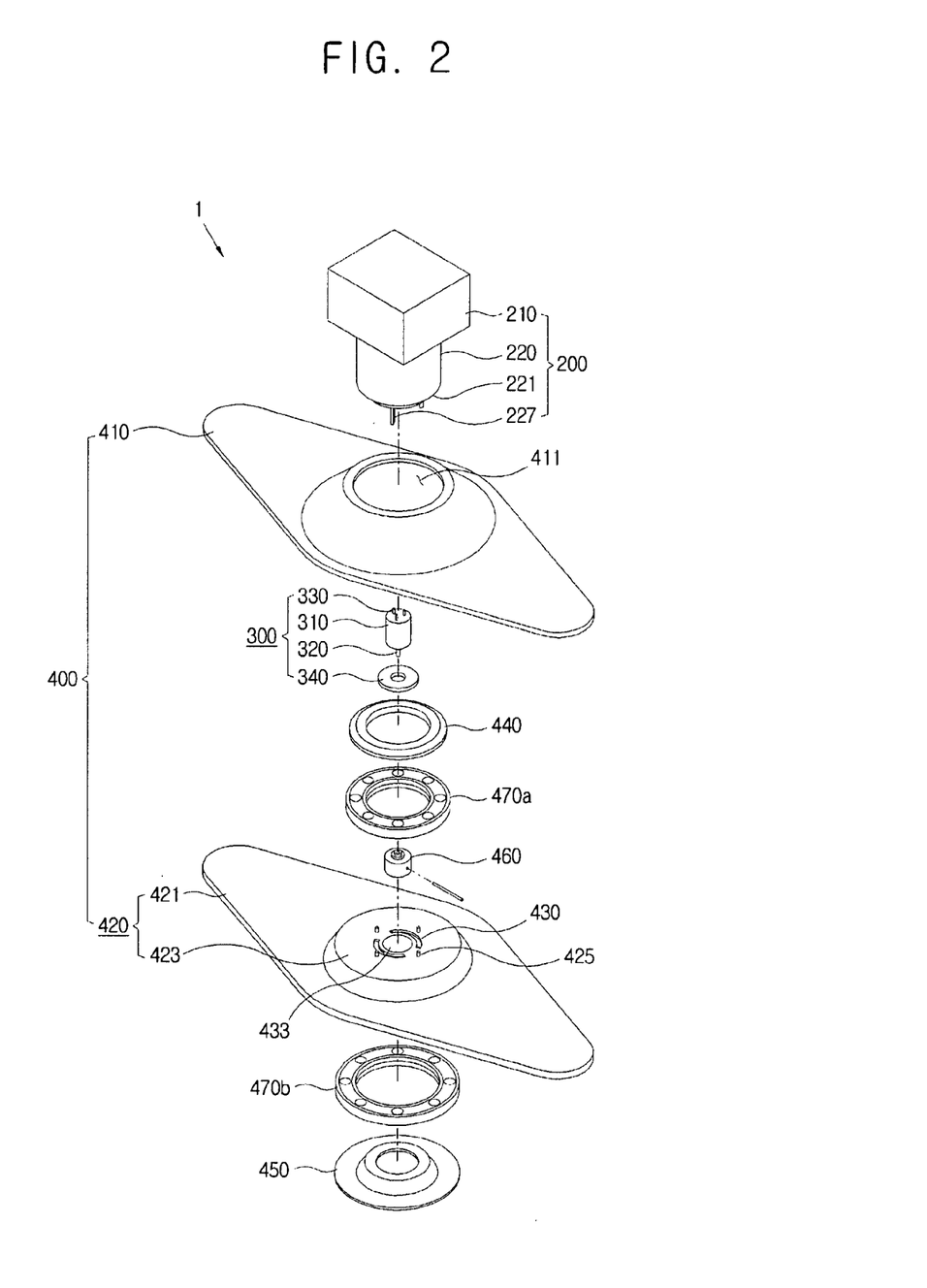
FIG. 2 is an exploded perspective view illustrating a display apparatus according to a first exemplary embodiment of the present invention.
Figure 3:
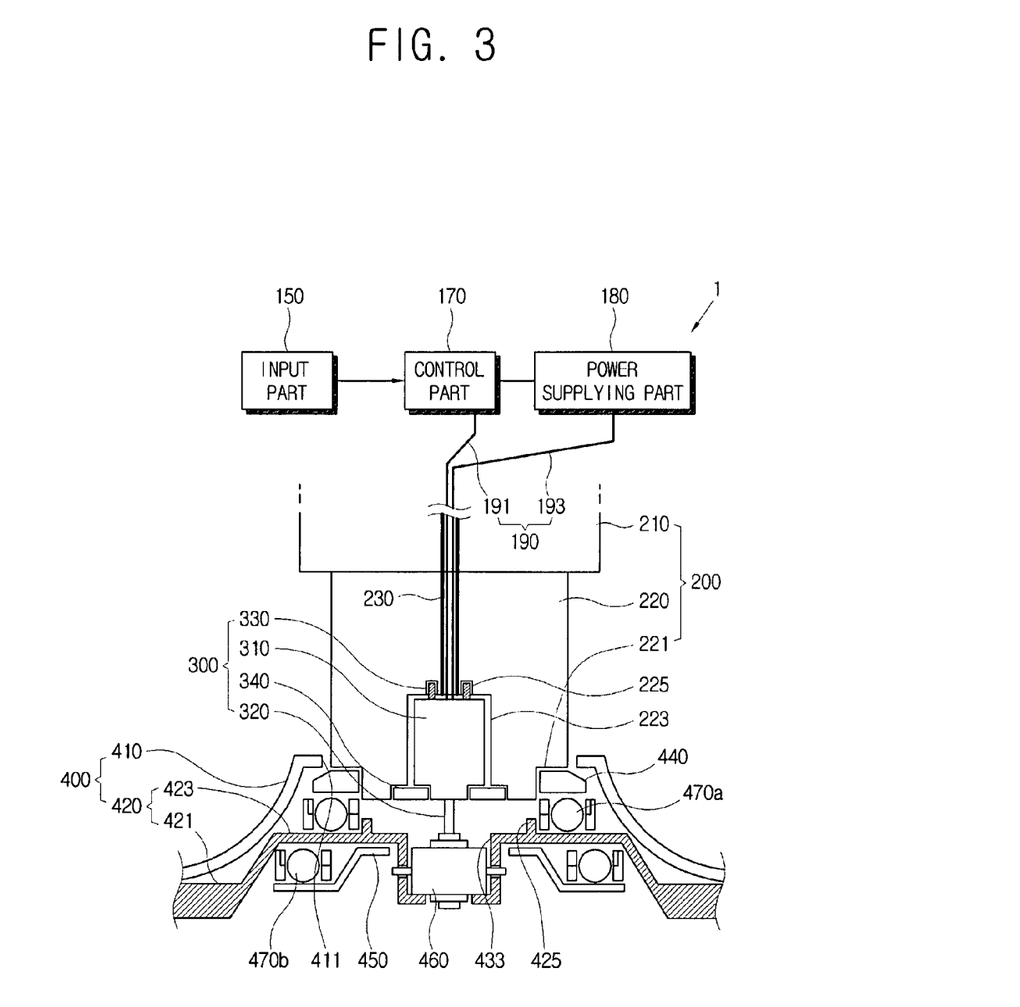
FIG. 3 is a sectional view taken along a direction Y in FIG. 1 according to the first exemplary embodiment of the present invention.
Figure 4:
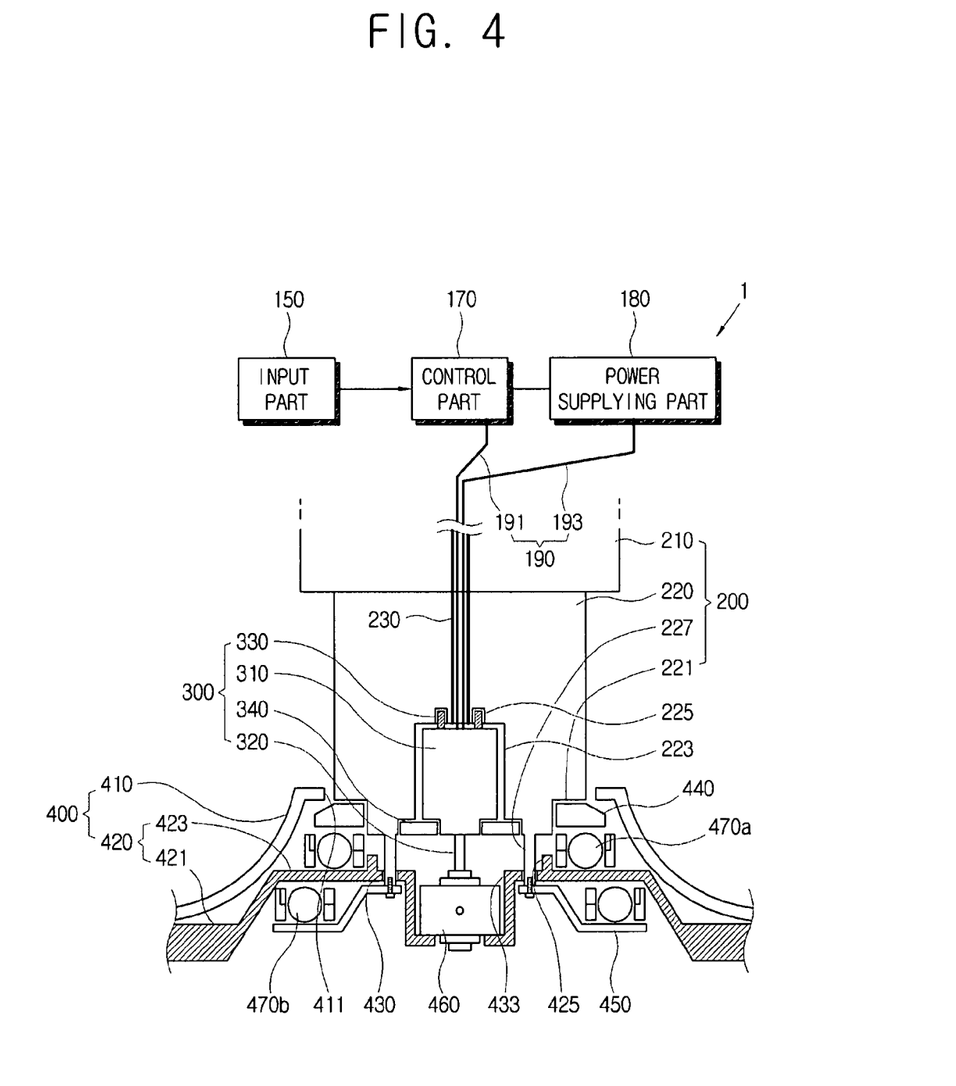
FIG. 4 is a sectional view taken along a direction X in FIG. 1 according to the first exemplary embodiment of the present invention.

The stand part 200 includes a display supporting member 210 coupled to a rear side of the display main body 100 to support the display main body 100, a stand member 220 extending from the display supporting member 210, and the cable unit accommodating part 230 formed in the display supporting member 210 and the stand member 220.

The stand member 220 is preferably formed in a cylindrical shape to smoothly swivel. The stand member 220 includes a swivel part 221 formed inwardly from a side surface of the stand member 220, a motor accommodating part 223 recessed from an end part of the stand member 220, and a stand extending part 227 extending from the end part of the stand member 220.

The swivel part 221 is inwardly stepped around the end part of the cylindrical stand member 220, and is supported by a swivel ring 440. The swivel part 221 slides against the swivel ring 440 when the stand part 220 swivels.

The motor accommodating part 223 is recessed inwardly from a center area of the end part of the stand member 220, and has a shape and a size corresponding to the shape and the size of the driving part 300 to accommodate the motor 310. The motor accommodating part 223 includes a supporting groove 225 accommodating a supporting protrusion 330 to support the motor 310.

At least one stand extending part 227 extends from the end part of the stand member 220. The stand extending part 227 has a thickness and a length to pass through the guide groove 430 to be coupled to a bracket part 450. The stand extending part 227 rotates along the guide groove 430 when the stand part 200 swivels, and may limit swiveling of the stand part 200 by when the stand extending part 227 is prevented from rotating by means at the opposite ends of the guide groove 430.

The cable unit accommodating part 230 accommodates the cable unit 190 in the display supporting member 210 and the stand member 220. The cable unit accommodating part 230 accommodates the cable unit 190 to extend from the display main body 100 to the driving part 300 via the stand member 220.

The driving part 300 swivels the stand part 200. The driving part 300 includes the motor 310; a driving circuit part 311 driving the motor 310; a rotating shaft 320 coupled to the motor 310 and extending toward the base part 400 to rotate by driving of the motor 310; and a supporting protrusion 330 protruding from a part of the motor 310 and accommodated by the supporting groove 225. The driving part 300 includes a motor cover 340 preventing the driving part 300 from being separated from the motor accommodating part 223.

The motor 310 is accommodated by the motor accommodating part 223 and supported at an inner side of the stand member 220. A main body of the motor 310 rotates by means of driving of the motor 310 and, thus, the display apparatus 1 can swivel more stably than when that stand part 200 is directly connected with the rotating shaft 320 to rotate. The motor 310 is connected to the power supplying part 180 through the power cable 193 to be supplied with power for driving.

The driving circuit part 311 is provided in the motor 310. The driving circuit part 311 is connected to the control part 170 through the control cable 191 and drives the motor 310 based on a control signal from the control part 170. The driving circuit part 311 drives the motor 310 when receiving the control signal including information on the swivel direction and the swivel angle from the control part 170.

A first end part of the rotating shaft 320 is coupled to the motor 310, and a second end part thereof is supported by a shaft supporting part 460 coupled to the base part 400. If the driving part 300 operates, since the second end part of the rotating shaft 320, which is not coupled to the motor 310, is supported by the shaft supporting part 460, the first end part thereof, which is coupled to the motor 310, rotates the motor 310. The supporting protrusion 330 of the motor 310 is supported by the supporting groove 225, and accordingly, the stand part 200 can swivel according to rotation of the motor 310.

The rotating shaft 320 may be configured to allow the stand part 200 to swivel when the display main body 100 is manually swiveled by a user, instead of being driven by the driving part 300. If a user applies a force, the stand member 220 accommodating the motor 310 may rotate about the rotating shaft 320 supported to the shaft supporting part 460. Thus, the stand part 220 can swivel.

The supporting protrusion 330 protrudes from the motor 310 to be accommodated by the supporting groove 225 so that the motor 310 is supported by the motor accommodating part 223. Thus, the supporting protrusion 330 enables the stand part 200 to swivel according to rotation of the motor 310. Alternatively, the supporting protrusion 330 may be provided on the motor accommodating part 223, and the supporting groove 225 may be provided on the motor 310 to correspond to the supporting protrusion 330.

The base part 400 contacts with the installation surface, and supports the stand part 200. The base part 400 supports the stand part 200 to swivel. When the stand part 200 swivels, the base part 400 is supported to the installation surface not to swivel together with the stand part 200. The base part 400 includes an upper base 410 forming an external appearance of the base part 400, and a lower base 420 coupled to the upper base 410 and contacting with the installation surface.

The upper base 410 may form an external appearance such as a circular shape, an elliptical shape, a rhombic shape, or the like. The upper base 410 is formed of plastic or metal. The upper base 410 includes an upper through hole 411 protruding from a surface thereof, through which the stand member 220 is inserted.

The lower base 420 has a shape adapted for the upper base 410. The lower base 420 includes a lower base main body 421 contacting with the installation surface, and a central part 423 protruding from a part of the lower base main body 421 to become distant from the installation surface and forming a circular surface.

Figure 5:
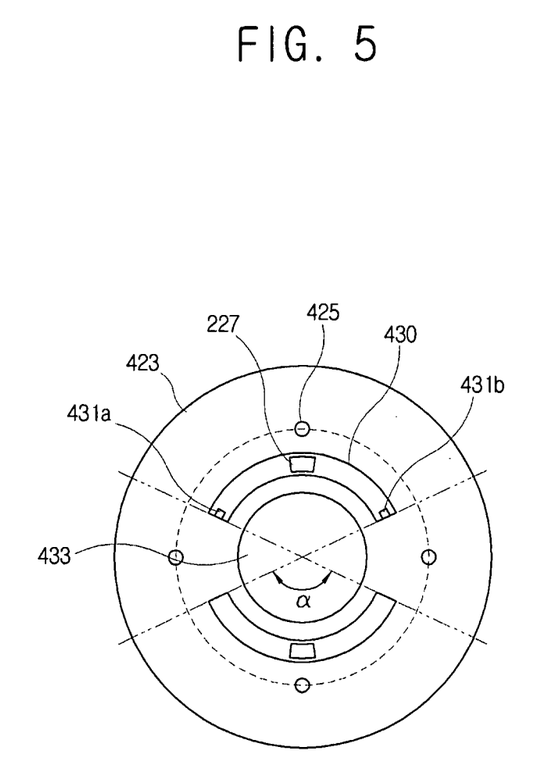
FIG. 5 is a plane view illustrating a central part of a lower base of the display apparatus according to the first exemplary embodiment of the present invention.

On a surface facing the stand part 200, the central part 423 includes a bearing supporting part 425 supporting the first bearing part 470a seated on the central part 423, the guide groove 430 formed in a circular arc through the central part 423 to be positioned between the bearing supporting part 425 and a central point of the central part 423, the contact sensors 431a and 431b disposed to the opposite ends of the guide groove 430, and a shaft support accommodating part 433 provided to the central point of the central part 423 to accommodate the shaft supporting part 460.

The central part 423 may be configured to have an area such that the first bearing part 470a is seated on a surface thereof.

The bearing supporting part 425 protrudes from a surface of the central part 423 to support the first bearing part 470a. The bearing supporting part 425 may be provided as a protruding part or a plurality of protrusions formed around an inner surface of the first bearing part 470a to have a set length.

The guide groove 430 is formed on the central part 423 to have a set length inside the bearing supporting part 425. The guide groove 430 has a width and length so that the stand extending part 227 smoothly moves along the guide groove 430 with passing therethrough. Also, the opposite ends of the guide groove 430 limit the moving of the stand extending part 227 so that the stand part 200 may be prevented from swiveling beyond a set angle.

The guide groove 430 is formed in a circular arc having the same center as the central part 423 so that the stand extending part 227 moves smoothly according to the swiveling of the stand part 200.

The contact sensors 431a and 431b are respectively provided at the opposite ends of the guide groove 430 to sense a contact of the stand extending part 227. When the stand extending part 227 contacts with an end part of the guide groove 227 so that the stand part 200 stops from further swiveling, the contact sensors 431a and 431b inform the control part 170 of it. The contact sensors 431a and 431b may generate a signal and transmit it to the control part 170 when contacting with the stand extending part 227. The contact sensors 431a and 431b are provided as touch sensors, but alternatively, the contact sensors 431a and 431b may be provided as light sensors or other known sensors.

The shaft support accommodating part 433 is formed in the central point of the central part 423 to accommodate the shaft supporting part 460. The shaft support accommodating part 433 supports the shaft supporting part 460 so that the motor 310 rotates with respect to the rotating shaft 320 supported by the shaft supporting part 460.

The swivel ring 440 supports the swivel part 221, and slides against the swivel part 221 when the stand part 200 swivels. The swivel ring 440 is slidably provided on the first bearing part 470a.

The bracket part 450 is provided on a rear side of the central part 423 to prevent the stand part 200 from being separated from the base part 400. The bracket part 450 is coupled to the stand extending part 227 which passes through the guide groove 430 and extends toward the installation surface, and accordingly, the bracket part 450 prevents the stand part 200 from being separated from the lower base 420. The bracket part 450 may be coupled with the stand extending part 227 by means of a screw, a hook or other known coupling means. When the stand part 200 swivels, the bracket part 450 rotates together with the stand extending part 227.

A central surface of the bracket part 450 upwardly protrudes from a circumferential surface thereof so that a slope is formed between the central surface and the circumferential surface thereof. The stand extending part 227 is coupled to the central surface, and the second bearing part 470b is seated on the circumferential surface to be supported.

The shaft supporting part 460 is accommodated by the shaft supporting accommodating part 433 to be supported thereto, and supports the rotating shaft 320. Thus, when the driving part 300 operates, the motor 310 rotates so that the stand part 200 swivels.

The bearing parts 470a and 470b reduce friction between the concerned members of the display apparatus 1 so that the stand part 200 smoothly swivels. When the stand part 200 swivels, the bearing parts 470a and 470b slidably contacts other members. Thus, the bearing parts 470a and 470b can minimize friction generated when the stand part 200 swivels.

The bearing parts 470a and 470b include the first bearing part 470a interposed between the swivel ring 440 and the central part 423, and the second bearing part 470b interposed between a rear side of the central part 423 and the bracket 450. Alternatively, the bearing parts 470a and 470b may be provided between other members rotatably contacting each other.

The first bearing part 470a is seated on the central part 423, and supports an underside of the swivel ring 440 so that the swivel ring 440 smoothly rotates when the stand part 200 swivels. The first bearing part 470a slides against at least one of the central part 423 and the swivel ring 440 when the stand part 200 swivels.

The second bearing part 470b is interposed between the central part 423 and the bracket part 450 so that the bracket part 450 smoothly rotates against an underside of the central part 423 when the stand part 200 swivels. The second bearing part 470b slides against at least one of the central part 423 and the bracket part 450 when the stand part 200 swivels.

Hereinafter, an operation of the display apparatus 1 will be described by referring to FIGS. 1 to 5.

A user directs a swivel direction and a swivel angle of the display main body 100 through the input part 150. The control part 170 controls the UI generating part 160 to display the user interface screen 161 on the display part 140, so that the user can assure the swivel direction and the swivel angle on the user interface screen 161.

The control part 170 receives an operation signal from the input part 150 and transmits a control signal on the swivel direction and the swivel angle directed by the user to the driving circuit part 311. The driving circuit part 311 drives the motor 310 based on the control signal from the control part 170, and the rotating shaft 320 rotates according to driving of the motor 310.

Since the rotating shaft 320 is supported to the shaft supporting part 460, the motor 310 rotates when the rotating shaft 320 rotates by driving of the motor 310. The stand part 200 swivels by means of coupling between the supporting protrusion 330 and the supporting groove 225.

Here, the bracket part 450 coupled to the stand extending part 227 rotates together with the stand part 200. The swivel part 221 slides with respect to the swivel ring 440, and the first bearing part 470a allows the swivel ring 440 to slide smoothly. Also, the second bearing part 470b allows the bracket part 450 to slide smoothly.

As shown in FIG. 5, the stand extending part 227 rotates along the guide groove 430 to have an allowable rotation angle α by means of swiveling of the stand part 200. When the stand extending part 227 reaches an end part of the guide groove 430 to stop further rotating, the stand extending part 227 contacts with the first contact sensor 431a. The first contact sensor 431a generates a signal according to contacting with the stand extending part 227. The control part 170 receives the signal and transmits the control signal to the driving circuit part 311 to stop the motor 300 so that the stand part 200 stops swiveling. This configuration may be applied to the second contact sensor 431b.

In the case that the stand extending part 227 contacts with the first contact sensor 431a, and the stand extending part 227 is intended to rotate to the other end part of the guide groove 430 in which the second contact sensor 431b is positioned, the control part 170 transmits the control signal to drive the motor 310 so that the stand part 200 swivels.

Also, a user can manually swivel the display main body 100. At this time, the stand part 200 rotates irrespective of the control part 170, the driving part 300, and the contact sensors 431a and 431b, and the stand extending part 227 is restricted by the opposite end parts of the guide groove 430. Thus, the stand part 200 can manually swivel to have the rotatable angle α. This is because the motor 310 may be rotated about the rotating shaft 320 by the force of the user when the driving part 300 is not operated.

Accordingly, the display apparatus 1 can automatically swivel the display main body 100, and minimize friction generated between the concerned members so that the stand part 200 smoothly swivels.

In the first exemplary embodiment, the motor 310 is supported by the stand part 200 and rotates by being driven itself so that the stand part 200 swivels. However, the configuration of the driving part 300 may be modified variously to perform the swivel mechanism of the stand part 200.

Figure 7:
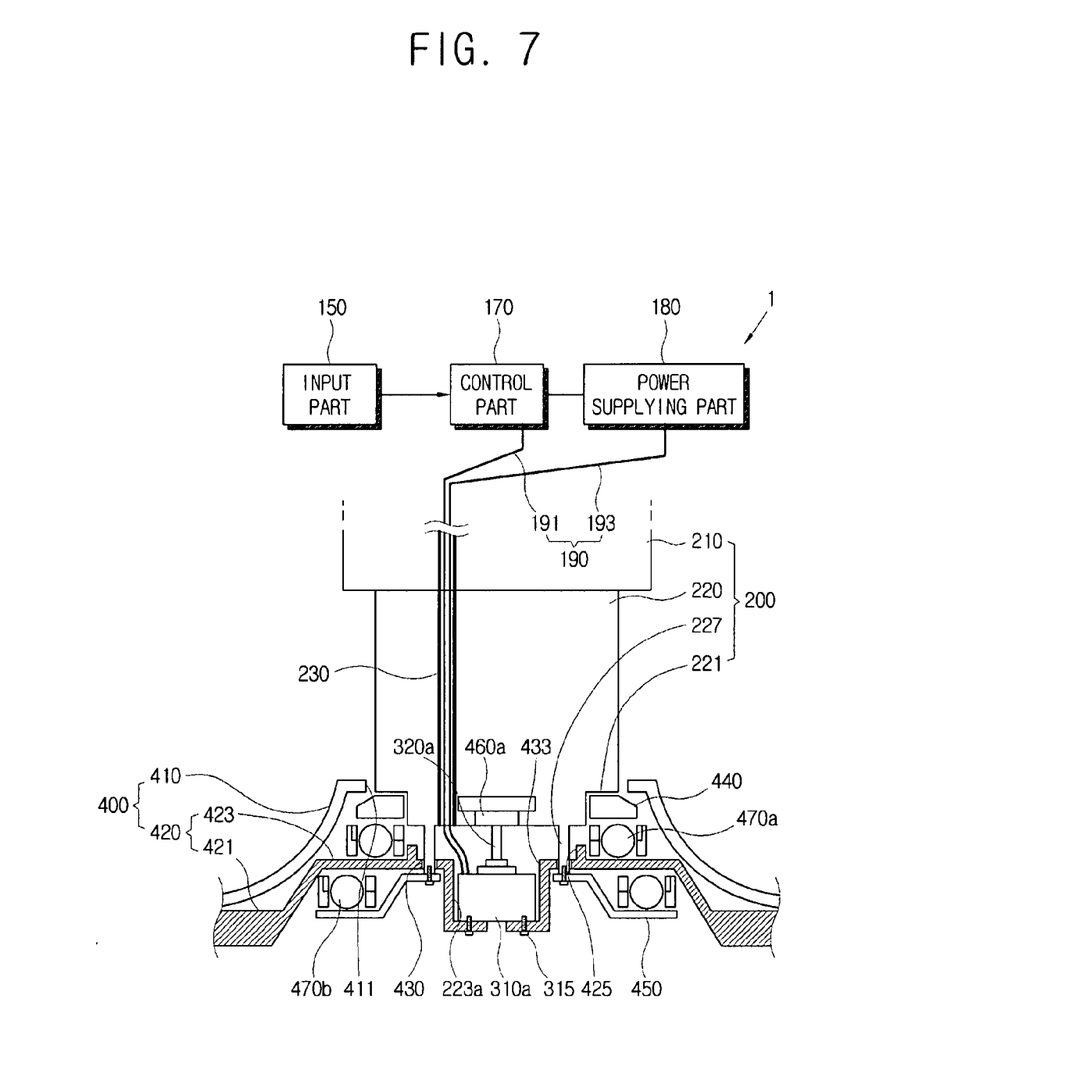
FIG. 7 is a sectional view taken along a direction X in FIG. 1 according to a second exemplary embodiment of the present invention.

As shown in FIG. 7, a display apparatus 1 according to a second exemplary embodiment of the present invention includes a motor accommodating part 223a formed in a base part 400; a motor 310a accommodated in the motor accommodating part 223a; a rotating shaft 320a extending from the motor 310a toward the stand part 200; and a shaft supporting part 460a provided in the stand part 200 and supporting an end part of the rotating shaft 320a. It should be noted that the following description will be made to only different features from those of the first exemplary embodiment, and description to the remaining similar features will not be repeated herein.

The motor accommodating part 223a is formed in a central point of a central part 423 to accommodate and support the motor 310a. The motor accommodating part 223a is coupled with the motor 310a by a screw 315 to support the motor 310a while being driven.

The shaft supporting part 460a is formed in a lower end part of the stand part 200 opposite to the motor accommodating part 223a. The shaft supporting part 460a may be detachably coupled with the stand member 220 or be formed in a single body with the stand member 220. The shaft supporting part 460a supports an end part of the rotating shaft 320a so that the stand part 200 swivels according to rotation of the rotating shaft 320a.

Hereinafter, an operation of the display apparatus 1 according to the second exemplary embodiment of the present invention will be described by referring to FIGS. 6 and 7.

A user directs a swivel direction and a swivel angle of a display main body 100 through an input part 150. The input part 150 generates an operation signal. A control part 170 transmits a control signal based on the operation signal to a driving circuit part 311. The driving circuit part 311 drives a motor 310 based on the control signal from the control part 170.

Here, the motor 310a is supported in the motor accommodating part 223a so as not to rotate, and an end part of the rotating shaft 320a is supported by the shaft supporting part 460a. Thus, swiveling force from the motor 310a operates to rotate the stand part 200 via the rotating shaft 320a and the shaft supporting part 460a.

As described above, an exemplary embodiment of the present invention provides a display apparatus automatically swiveling a display main body and a stand part to improve convenience of a user by employing a driving part controlled by a control part in order to perform a swivel mechanism of the stand part supporting the display main body.

An exemplary embodiment of the present invention further provides a display apparatus adopting a required swivel angle accurately through an automatic swiveling structure.

Also, the present invention provides a display apparatus preventing damages of component which may be generated when a user manually swivel a display main body by smoothly and stably swiveling a stand part.

Lastly, an exemplary embodiment of the present invention provides a display apparatus improved in performance by performing the aforementioned functions.

Although a few exemplary embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A display apparatus comprising:
   a stand part which supports a display main body and accommodates a cable unit which transmits a signal;
   a base part to support the stand part;
   a driving part electrically connected to the cable unit and which moves the stand part relative to the base part;
   a control part which controls the driving part using the signal, and
   a display part which displays a swivel direction and a swivel angle of the stand part when the stand part is moved relative to the base part,
   wherein the driving part comprises a motor coupled to the stand part for generating driving power to move the stand part, and a shaft extended from the motor toward the base part and rotating by the driving power generated from the motor, and
   wherein the base part comprises a shaft supporting part configured to couple to an end portion of the shaft extended toward the base part so that the stand part swivels together with the motor relative to the base part around an axis of the shaft by the driving power generated from the motor.

2. The display apparatus according to claim 1, wherein the driving part further comprises a driving circuit part provided in the motor to be electrically connected to the control part and which controls the motor based on the signal from the control part.

3. The display apparatus according to claim 1, wherein the stand part comprises a stand extending part which extends from the stand part toward the base part.

4. The display apparatus according to claim 3, wherein the base part comprises a guide groove through which the stand extending part passes, configured as a circular arc and which guides the stand extending part as the stand part swivels relative to the base part.

5. The display apparatus according to claim 4, further comprising a bracket part provided on a bottom side of the base part which is configured to prevent the stand part from being separated from the base part.

6. The display apparatus according to claim 5, wherein the bracket part is coupled to the stand extending part which passes through the guide groove.

7. The display apparatus according to claim 4, further comprising contact sensors provided at opposite ends of the guide groove which sense whether the stand extending part reaches one of the opposite ends of the guide groove.

8. The display apparatus according to claim 7, wherein the control part receives a sensing signal from one of the contact sensors to control the driving part.

9. The display apparatus according to claim 1, further comprising a rotating portion which rotatably supports the stand part with respect to the base part.

10. The display apparatus according to claim 9, wherein the rotating portion comprises a bearing part.

11. The display apparatus according to claim 9, wherein the bearing part comprises a first bearing part interposed between the stand part and the base part; and a second bearing part interposed between the base part and a bracket disposed below the base part.

12. The display apparatus according to claim 1, further comprising a rotating portion which rotatably supports the stand part with respect to the base part.

13. The display apparatus according to claim 12, wherein the rotating portion comprises a bearing part.

14. The display apparatus according to claim 13, wherein the bearing part comprises a first bearing part interposed between the stand part and the base part; and a second bearing part interposed between the base part and a bracket disposed below the base part.

15. The display apparatus according to claim 1, further comprising a power supply part which supplies power through the cable unit to the driving part.

16. The display apparatus according to claim 1, wherein the motor is rotated together with the stand part relative to the base part.

17. The display apparatus according to claim 16, wherein the stand part is swiveled relative to the base part according to a rotation of the main body of the motor.

18. A display apparatus comprising:
a stand part which supports a display main body;
a base part to support the stand part;
a driving part electrically connected to a cable unit and which moves the stand part relative to the base part;
a control part which controls the driving part by transmitting a signal via the cable unit, and
a display part which displays a swivel direction and a swivel angle of the stand part when the stand part is moved relative to the base part,
wherein the driving part comprises a motor coupled to the base part for generating driving power to move the stand part, and a shaft extended from the motor toward the stand part rotating by the driving power generated from the motor and
wherein the stand part comprises a shaft supporting part configured to couple to an end portion of the shaft extended toward the stand part so that the stand part swivels together with the shaft relative to the base part around an axis of the shaft by the driving power generated from the motor.

19. The display apparatus according to claim 18, wherein the stand part accommodates the cable unit which transmits the signal.

20. A supporting apparatus for supporting a display apparatus comprising:
a stand configured to couple to the display apparatus;
a base configured to support the stand; and
a driving unit configured to electrically connect to the display apparatus and moves the stand relative to the base,
wherein the driving unit comprises a motor coupled to the stand for generating driving power to move the stand, and a shaft extended from the motor toward the base and rotating by the driving power generated from the motor,
wherein the base comprises a shaft supporter configured to couple to the shaft extended toward the base so that the stand swivels together with the motor relative to the base around an axis of the shaft by the driving power generated from the motor, and
wherein a cable is configured to electrically connect between the display apparatus and the driving unit, transmit a control signal, and supply a power to the driving unit.

21. The supporting apparatus according to claim 20, wherein the driving unit further comprises a driving circuit provided in the motor to be electrically connected to a controller of the display apparatus and configured to control the motor based on the control signal from the controller.

22. The supporting apparatus according to claim 20, wherein the stand comprises an extending part extended from the stand toward the base.

23. The supporting apparatus according to claim 22, wherein the base comprises a guide groove through which the extending part passes, configured as a circular arc and which guides the extending part as the stand swivels relative to the base part.

24. The supporting apparatus according to claim 23, further comprising a bracket provided on a bottom side of the base which is configured to prevent the stand from being separated from the base.

25. The supporting apparatus according to claim 24, wherein the bracket is coupled to the extending part which passes through the guide groove.

26. The supporting apparatus according to claim 23, further comprising sensors provided at opposite ends of the guide groove and configured to sense whether the extending part reaches one of the opposite ends of the guide groove.

27. The supporting apparatus according to claim 26, wherein the driving unit is electrically connected to a controller of the display apparatus, and the sensor transmits a sensing signal to the controller so that the driving unit is controlled by the controller based on the sensing signal.

28. The supporting apparatus according to claim 20, further comprising a rotating portion configured to rotatably support the stand with respect to the base.

29. The supporting apparatus according to claim 28, wherein the rotating portion comprises a bearing unit.

30. The supporting apparatus according to claim 29, wherein the bearing unit comprises a first bearing interposed between the stand and the base; and a second bearing interposed between the base and a bracket, the bracket being disposed below the base.

31. The supporting apparatus according to claim 20, wherein the driving unit is configured to receive the power for generating the driving power from a power supply of the display apparatus through the cable.

32. The supporting apparatus according to claim 20, wherein the motor is rotated together with the stand relative to the base.

33. The supporting apparatus according to claim 32, wherein the stand is swiveled relative to the base according to a rotation of a main body of the motor.

* * * * *